(12) United States Patent
Bower, III et al.

(10) Patent No.: US 10,862,803 B2
(45) Date of Patent: Dec. 8, 2020

(54) REPURPOSING A TARGET ENDPOINT TO EXECUTE A MANAGEMENT TASK

(71) Applicant: LENOVO ENTERPRISE SOLUTIONS (SINGAPORE) PTE. LTD., Singapore (SG)

(72) Inventors: Fred A. Bower, III, Durham, NC (US); Andrew J. Sloma, Austin, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 617 days.

(21) Appl. No.: 14/843,603

(22) Filed: Sep. 2, 2015

(65) Prior Publication Data

US 2017/0063718 A1   Mar. 2, 2017

(51) Int. Cl.
*H04L 12/927* (2013.01)
*H04L 12/911* (2013.01)
*H04L 12/70* (2013.01)

(52) U.S. Cl.
CPC ............ *H04L 47/00* (2013.01); *H04L 47/803* (2013.01); *H04L 47/822* (2013.01)

(58) Field of Classification Search
CPC ..... H04L 47/803; H04L 47/822; H04L 47/00; H04L 12/927; H04L 12/911; H04L 29/08144; H04L 29/06; H04L 29/08072; H04L 29/08171; H04L 12/5695; H04L 12/56; H04L 12/70
USPC ........ 709/226, 223; 340/16.1; 710/36; 726/1
See application file for complete search history.

(56) References Cited

U.S. PATENT DOCUMENTS

| 6,549,932 | B1* | 4/2003 | McNally | G06F 9/4862 709/202 |
| 6,985,436 | B1* | 1/2006 | Bhaskar | H04L 45/30 370/229 |
| 7,810,090 | B2* | 10/2010 | Gebhart | G06F 8/60 717/176 |
| 8,065,676 | B1* | 11/2011 | Sahai | G06F 9/5077 709/226 |
| 8,141,090 | B1* | 3/2012 | Graupner | G06F 9/45558 709/225 |
| 2002/0144143 | A1* | 10/2002 | Chang | H04L 41/5009 726/1 |
| 2009/0019137 | A1* | 1/2009 | Mishra | H04L 41/5054 709/220 |
| 2010/0250748 | A1* | 9/2010 | Sivasubramanian | G06F 11/3442 709/226 |
| 2012/0185848 | A1* | 7/2012 | Devarakonda | G06F 9/5077 718/1 |

(Continued)

*Primary Examiner* — Tonia L Dollinger
*Assistant Examiner* — Mehulkumar J Shah

(57) ABSTRACT

Repurposing a target endpoint to execute a management task, including: identifying an amount of computing resources required to execute a management task that controls one or more operational aspects of a target endpoint; identifying an amount of computing resources required to repurpose the target endpoint such that the target endpoint can participate in the execution of the management task; determining, in dependence upon the amount of computing resources required to execute the management task and the amount of computing resources required to repurpose the target endpoint, whether to repurpose the target endpoint; and responsive to determining to repurpose the target endpoint, initiating execution of a portion of the management task on the target endpoint.

20 Claims, 5 Drawing Sheets

(56) References Cited

U.S. PATENT DOCUMENTS

| | | | | |
|---|---|---|---|---|
| 2013/0086593 A1* | 4/2013 | Sloma | ............... | G06F 9/5033 |
| | | | | 718/105 |
| 2013/0304903 A1* | 11/2013 | Mick | ............... | H04L 43/0817 |
| | | | | 709/224 |
| 2014/0075173 A1* | 3/2014 | Bower | ............... | G06F 9/4401 |
| | | | | 713/2 |
| 2014/0245316 A1* | 8/2014 | Archer | ............ | G06F 15/17318 |
| | | | | 718/104 |
| 2014/0324911 A1* | 10/2014 | de Lavarene | ........ | G06F 9/5011 |
| | | | | 707/781 |
| 2015/0106805 A1* | 4/2015 | Melander | ............ | G06F 9/5072 |
| | | | | 718/1 |
| 2015/0235308 A1* | 8/2015 | Mick | ............... | G06F 9/45558 |
| | | | | 705/26.3 |
| 2015/0355950 A1* | 12/2015 | Attalla | ............... | G06F 11/3433 |
| | | | | 718/1 |
| 2016/0094483 A1* | 3/2016 | Johnston | ............... | G06F 8/65 |
| | | | | 709/226 |
| 2016/0241432 A1* | 8/2016 | Vidyadhara | ........ | H04L 41/0803 |
| 2017/0063718 A1* | 3/2017 | Bower, III | ............ | H04L 47/00 |

\* cited by examiner

REPURPOSING A TARGET ENDPOINT TO EXECUTE A MANAGEMENT TASK

BACKGROUND OF THE INVENTION

Field of the Disclosure

The field of the disclosure is data processing, or, more specifically, methods, apparatus, and products for repurposing a target endpoint to execute a management task.

Description of Related Art

Modern managed computing environments may be embodied as data centers that service a plurality of users. A given managed computing environment may include a plurality of management servers, with each user's computing needs serviced by one or more of these management servers. When a management task is to be executed by a management server for a user, that management task may require more computing resources than can be provided by the assigned management server(s). In such situations, a managed computing environment may be forced to either dedicate additional management servers to a user's needs and/or increase the time required to complete the management task.

SUMMARY OF THE INVENTION

Methods, apparatuses, and products for repurposing a target endpoint to execute a management task, including: identifying an amount of computing resources required to execute a management task that controls one or more operational aspects of a target endpoint; identifying an amount of computing resources required to repurpose the target endpoint such that the target endpoint can participate in the execution of the management task; determining, in dependence upon the amount of computing resources required to execute the management task and the amount of computing resources required to repurpose the target endpoint, whether to repurpose the target endpoint; and responsive to determining to repurpose the target endpoint, initiating execution of a portion of the management task on the target endpoint.

The foregoing and other objects, features and advantages of the disclosure will be apparent from the following more particular descriptions of example embodiments of the disclosure as illustrated in the accompanying drawings wherein like reference numbers generally represent like parts of example embodiments of the disclosure.

DETAILED DESCRIPTION OF EXAMPLE EMBODIMENTS

Figure 1:
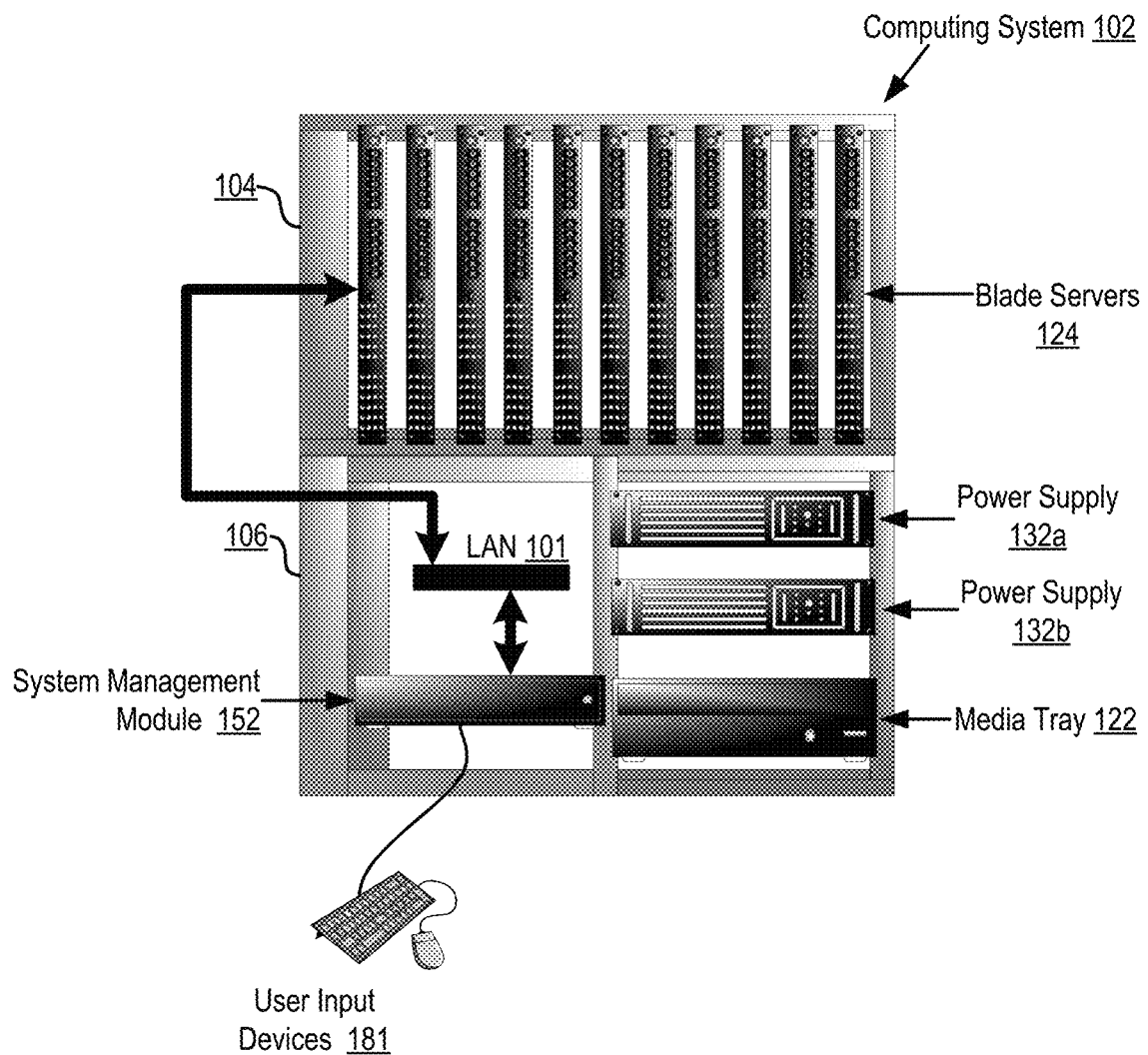
FIG. 1 sets forth a diagram of an example computing system in which a target endpoint may be repurposed to execute a management task according to embodiments of the present disclosure.

Example methods, apparatuses, and products for repurposing a target endpoint to execute a management task in accordance with the present disclosure are described with FIG. 1 sets forth a diagram of an example computing system (102) in which repurposing a target endpoint to execute a management task may be implemented, according to embodiments of the present disclosure. One or more computing system(s) (102) may be configured to operate a managed computing environment, in accordance with certain embodiments of the present disclosure. The computing system (102) of FIG. 1 includes a plurality of integrated technology elements ("ITEs") that can receive power from a plurality of power supplies (132a, 132b). Each ITE represents a computing component such as a storage device, a blower, a blade server (124), or other power consuming computing component of the computing system (102).

The ITEs depicted in FIG. 1 can receive power from a plurality of power supplies (132a, 132b). Each power supply (132a, 132b) in FIG. 1 is a device that supplies electric power to an electrical load. Each power supply (132a, 132b) may be embodied, for example, as a switched mode power supply that transfers power from a source such as mains power to a load such as the ITEs, while converting voltage and current characteristics.

The computing system (102) of FIG. 1 is depicted as a chassis environment. A 'chassis environment,' as the term is used in this specification, refers generally to computer equipment rack. In the example of FIG. 1, the chassis environment is implemented as a particular type of computer equipment rack, a blade server system. The blade server system in the example depicted in FIG. 1 is installed in a two-bay chassis (104, 106) and includes one or more of blade servers (124), one or more system management modules (152), one or more media trays (122), and one or more power supplies (132a, 132b). The computing system (102) of FIG. 1 therefore includes a plurality of ITEs, illustrated in this example as blade servers (124), the system management module (152), and the media tray (122), although readers will appreciate that in other embodiments additional ITEs may be included in the computing system (102), where each additional ITE can be embodied as any power consuming computing component of the chassis environment. In some embodiments, one or more management server(s) may be resident on one or more ITEs such as the blade server(s) (124).

The system management module (152) of FIG. 1 may be embodied as a computer, including software and hardware components, one or more computer processors and computer memory, that provides system management functions for components in the example chassis environment, including the blade servers (124) and the media tray (122). The system management module (152) of FIG. 1 may also make available connections for user input devices such as mice or keyboards (181) that are not generally connected directly to the blade servers (124) or to the chassis itself.

In some embodiments, the system management module (152) of FIG. 1 may be a separate computing device, managing one or more ITEs such as blade server(s) (124). In the same or alternative embodiments, the system management module (152) of FIG. 1 may be an integral part of one or more ITEs such as blade server(s) (124). In some embodiments, the system management module (152) of FIG. 1 may be operable to repurpose a target endpoint to execute a management task by identifying an amount of computing resources required to execute a management task that controls one or more operational aspects of a target endpoint, identifying an amount of computing resources required to repurpose the target endpoint such that the target endpoint can participate in the execution of the management task, determining whether to repurpose the target endpoint; and responsive to determining to repurpose the target endpoint in dependence upon the amount of computing resources required to execute the management task and the amount of computing resources required to repurpose the target endpoint, and initiating execution of a portion of the management task on the target endpoint, as will be described in greater detail below.

The computing system (102) of FIG. 1 also includes one or more blade servers (124). The one or more blade servers (124) of FIG. 1 are installed in cabinet bay (104) of the example computing system (102). Such blade servers (124) are computing devices implemented in blade form factor. The blade servers (124) may share access to the media tray (122) and may be connected to one another and to the system management module (152) for data communications through a local area network ("LAN") (101), which may be embodied as a small network installed within the computing system (102).

The computing system (102) of FIG. 1 also includes one or more media trays (122). The one or more media trays (122) in FIG. 1 may house non-volatile memory media generally. A media tray (122) may typically include Compact Disc read-only media drives ("CD-ROM"), Digital Video Disc ROM drives ("DVD-ROM"), CD-RW drives, DVD-RW drives, floppy disk drives, and so on as will occur to those of skill in the art.

The arrangement of the chassis environment, network (101), and other devices making up the example computing system (102) illustrated in FIG. 1 are for explanation, not for limitation. Computing systems useful according to various embodiments of the present disclosure may include additional servers, routers, and other devices, not shown in FIG. 1, as will occur to those of skill in the art. Networks in such data processing systems may support many data communications protocols, including Transmission Control Protocol ("TCP"), Internet Protocol ("IP"), HyperText Transfer Protocol ("HTTP"), Wireless Access Protocol ("WAP"), Handheld Device Transport Protocol ("HDTP"), and others as will occur to those of skill in the art. Various embodiments of the present disclosure may be implemented on a variety of hardware platforms in addition to those illustrated in FIG. 1.

Figure 2:
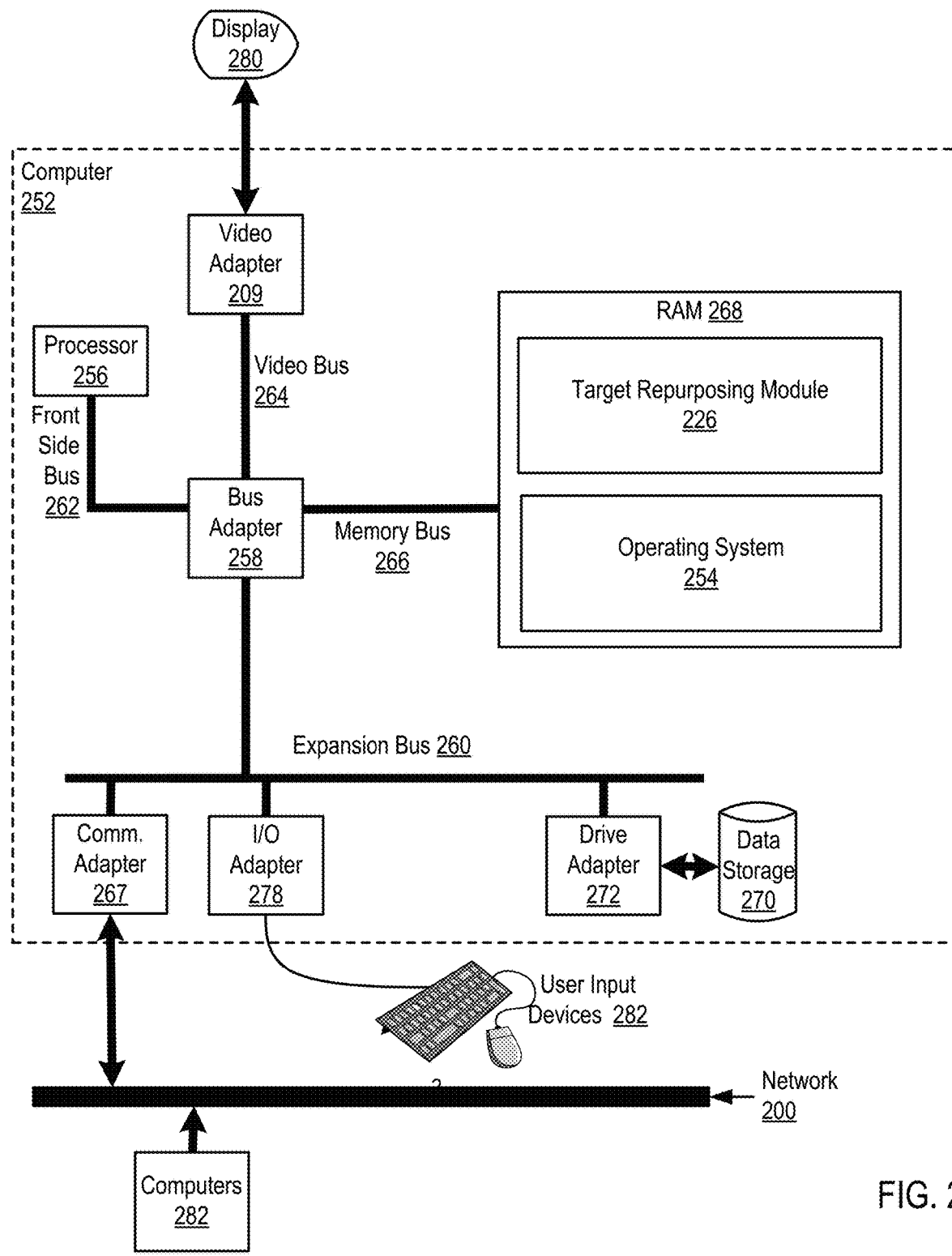
FIG. 2 sets forth a block diagram of automated computing machinery comprising an example computer useful for repurposing a target endpoint to execute a management task according to embodiments of the present disclosure.

For further explanation, FIG. 2 sets forth a block diagram of automated computing machinery comprising an example computer (252) useful in repurposing a target endpoint to execute a management task according to embodiments of the present disclosure. The computer (252) of FIG. 2 includes at least one computer processor (256) or "CPU" as well as random access memory ("RAM") (268) which is connected through a high speed memory bus (266) and bus adapter (258) to processor (256) and to other components of the computer (252). Stored in RAM (268) is a target repurposing module (226), a module of computer program instructions for repurposing a target endpoint to execute a management task according to embodiments of the present disclosure.

The target repurposing module (226) may be configured for repurposing a target endpoint to execute a management task by identifying an amount of computing resources required to execute a management task that controls one or more operational aspects of a target endpoint; identifying an amount of computing resources required to repurpose the target endpoint such that the target endpoint can participate in the execution of the management task; determining, in dependence upon the amount of computing resources required to execute the management task and the amount of computing resources required to repurpose the target endpoint, whether to repurpose the target endpoint; and responsive to determining to repurpose the target endpoint, initiating execution of a portion of the management task on the target endpoint, as described in more detail below.

Also stored in RAM (268) is an operating system (254). Operating systems useful in computers configured for repurposing a target endpoint to execute a management task according to embodiments described herein include UNIX™, Linux™, Microsoft XP™, AIX™, IBM's i5/OS™, and others as will occur to those of skill in the art. The operating system (254), and target repurposing module (226) in the example of FIG. 2 are shown in RAM (268), but many components of such software typically are stored in non-volatile memory also, such as, for example, on a disk drive (270).

The example computer (252) of FIG. 2 also includes disk drive adapter (272) coupled through expansion bus (260) and bus adapter (258) to processor (256) and other components of the computer (252). Disk drive adapter (272) connects non-volatile data storage to the computer (252) in the form of disk drive (270). Disk drive adapters useful in computers configured for repurposing a target endpoint to execute a management task according to embodiments described herein include Integrated Drive Electronics ("IDE") adapters, Small Computer System Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computer (252) of FIG. 2 includes one or more input/output ("I/O") adapters (278). I/O adapters implement user-oriented input/output through, for example, software drivers and computer hardware for controlling output to display devices such as computer display screens, as well as user input from user input devices (181) such as keyboards and mice. The example computer (252) of FIG. 2 includes a video adapter (209), which is an example of an I/O adapter specially designed for graphic output to a display device (280) such as a display screen or computer monitor. Video adapter (209) is connected to processor (256) through a high speed video bus (164), bus adapter (258), and the front side bus (262), which is also a high speed bus.

The example computer (252) of FIG. 2 includes a communications adapter (267) for data communications with other computers (282) and for data communications with a data communications network (200). Such data communications may be carried out serially through RS-232 connections, through external buses such as a Universal Serial Bus ('USB'), through data communications networks such as IP data communications networks, and in other ways as will occur to those of skill in the art. In some embodiments, other computers (282) may include other ITEs of computer system (102) and/or system management module (152). Communications adapters implement the hardware level of data communications through which one computer sends data communications to another computer, directly or through a data communications network. Examples of communications adapters useful in computers configured for repurposing a target endpoint to execute a management task according to embodiments described herein include modems for wired dial-up communications, Ethernet (IEEE 802.3) adapters for wired data communications, and 802.11 adapters for wireless data communications.

The computer (252) may implement certain instructions stored on RAM (268) for execution by processor (256) for repurposing a target endpoint to execute a management task. In some embodiments, targeting an endpoint for repurposing may be implemented as part of a larger set of executable instructions. For example, the target repurposing module (226) may be part of an overall system management process. An overall system management process may be responsible for determining which management servers to allocate to a particular management task. As noted above, certain known techniques for allocating management servers may result in unnecessary resources being permanently allocated to a user in order to account for relatively infrequent high-consumption management tasks. However, according to certain embodiments of the present disclosure, by repurposing the user's endpoints for those high-consumption management tasks, the amount of resources allocated to the user (and thus the user's cost) may be reduced.

Figure 3:
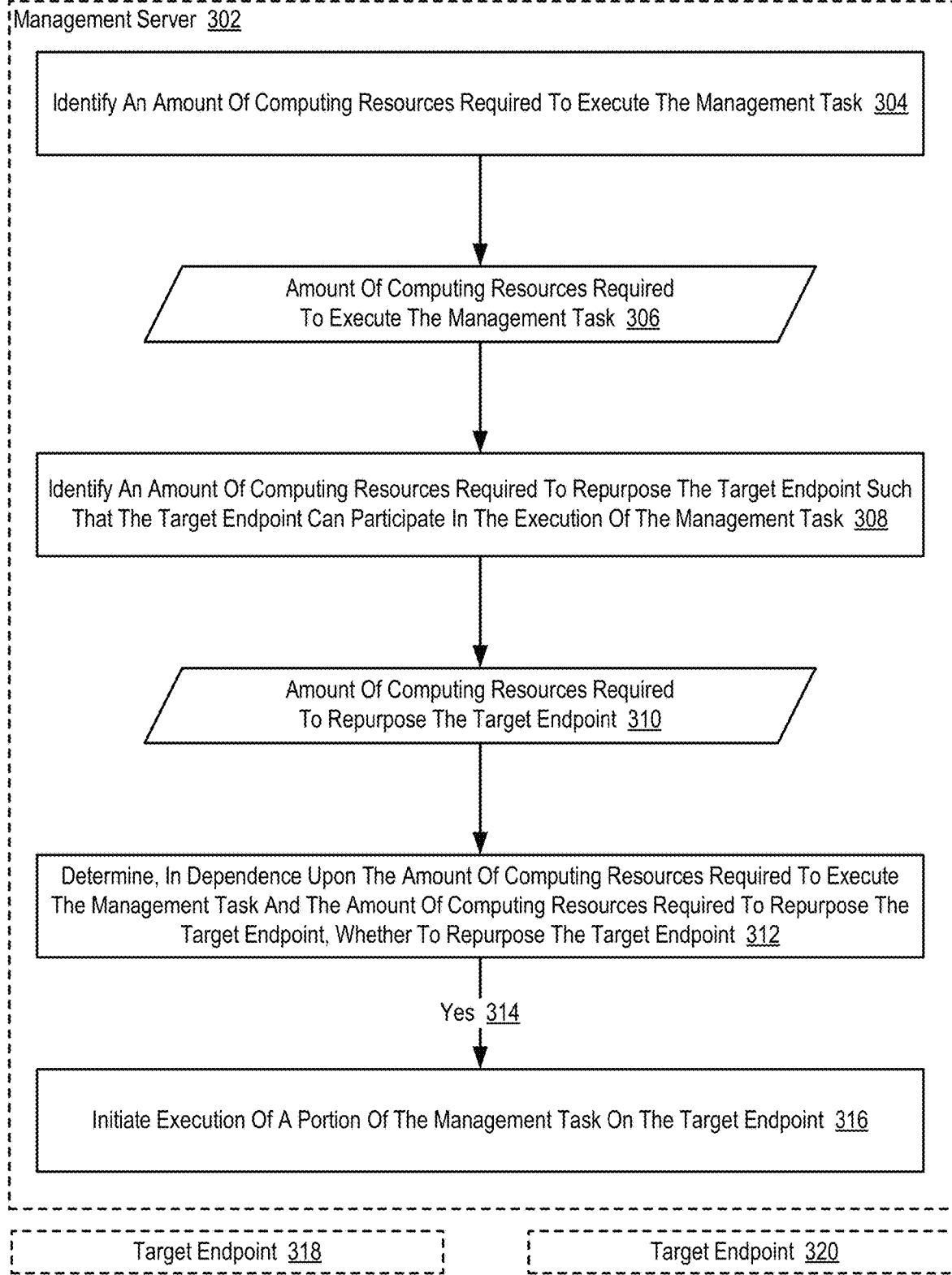
FIG. 3 sets forth a flow chart illustrating an example method for repurposing a target endpoint to execute a management task according to certain embodiments of the present disclosure.

For further explanation, FIG. 3 sets forth a flow chart illustrating an example method for repurposing a target endpoint to execute a management task according to certain embodiments of the present disclosure. The example method depicted in FIG. 3 is carried out, at least in part, by a management server (302). The management server (302) depicted in FIG. 3 may be embodied, for example, as a standalone computer, a standalone server, a server that is included in a larger computing system, and so on.

The management server (302) depicted in FIG. 3 may be configured to perform one or more management tasks. Such management tasks may be embodied as any set of computer program instructions that, when executed, propagates a change in the programming and/or operation of a target endpoint (318, 320). Examples of such management tasks include powering a target endpoint on or off, managing a network environment, deploying operating system images, applying firmware updates, applying system updates, and so on. Such target endpoints (318, 320) may be embodied as electronic devices, or a component thereof, against which the management server (302) may execute a management task. Examples of target endpoints (318, 320) can include personal computers, laptop computers, tablet computers, smart phones, switching devices, routers, rack mounted servers, any of the components contained therein, and so on.

The example method depicted in FIG. 3 includes identifying (304) an amount (306) of computing resources required to execute a management task that controls one or more operational aspects of a target endpoint (318, 320). The amount (306) of computing resources required to execute a management task can include, for example, the amount of processor cycles required to execute the management task, the amount of processing time required to execute the management task, the amount of network bandwidth required to execute the management task, the amount of disk capacity required to execute the management task, and so on. Readers will appreciate that some management tasks may require more computing resources than others. For example, the management server (302) may be tasked with deploying an operating system to a large number of endpoints (e.g., laptop computers, desktop computers, servers, switching equipment, mobile computers, etc.). Such a task may require a larger amount of computing resources than a simpler management task such as powering down a single target endpoint.

Identifying (304) the amount (306) of computing resources required to execute the management may be carried out, for example, by the management server (302) deriving the amount (306) of computing resources required to execute a management task in response to receiving information describing the management task. The management server (302) may derive the amount (306) of computing resources required to execute the management task, for example, by determining a number of computer program instructions required to execute a single instance of the task, by determining a number of target endpoints that a single instance of the task will be executed upon, and so on. Such a derivation may include results predicted by examining the tasks itself, results predicted based on previous instances where the task was executed, and so on. Alternatively, such a derivation may be made elsewhere and reported to the management server (302), such that identifying (304) the amount (306) of computing resources required to execute the management is carried out by the management server (302) receiving such information form another source.

The example method depicted in FIG. 3 also includes identifying (308) an amount (310) of computing resources required to repurpose the target endpoint (318, 320) such that the target endpoint (318, 320) can participate in the execution of the management task. In the example method depicted in FIG. 3, repurposing a target endpoint (318, 320) may be carried out, for example, by powering down the target endpoint (318, 320) and rebooting the target endpoint (318, 320) into a management-worker environment such that the target endpoint (318, 320) is under the full control of the management server (302). In the example method depicted in FIG. 3, identifying (308) the amount (310) of computing resources required to repurpose the target endpoint (318, 320) may therefore be carried out, for example, by determining an amount of processing cycles that would be required to instruct target endpoint (318, 320) to power down and reboot into a management-worker environment, determining an amount of network bandwidth that would be required to instruct target endpoint (318, 320) to power down and reboot into a management-worker environment, determining an amount of processing cycles and network bandwidth that would be required transmit management task instructions to the target endpoint (318, 320), and so on.

The example method depicted in FIG. 3 also includes determining (312), in dependence upon the amount (306) of computing resources required to execute the management task and the amount (310) of computing resources required to repurpose the target endpoint (318, 320), whether to repurpose the target endpoint (318, 320). Determining (312) whether to repurpose the target endpoint (318, 320) may be carried out, for example, by determining whether the time required for the management server (302) to execute the management task is less than the time required for the management server (302) to repurpose one or more target endpoint (318, 320) and have the management server (302) as well as the one or more target endpoints (318, 320) participate in the execution of the management task. In such an example, determining the amount of time required for the management server (302) to execute the management task may be carried out by determining the amount of time required for the management server (302) to provide the amount (306) of computing resources required to execute the management task. Similarly, determining the amount of time required for the management server (302) to repurpose one or more target endpoint (318, 320) and have the management server (302) as well as the one or more target endpoints (318, 320) participate in the execution of the management task may be carried out, for example, by determining the amount of time required for the management server (302) and the target endpoint (318, 320) to provide the sum of the amount (306) of computing resources required to execute the management task and the amount (310) of computing resources required to repurpose the target endpoint (318, 320).

Consider an example in which both the amount (306) of computing resources required to execute the management task and the amount (310) of computing resources required to repurpose the target endpoint (318, 320) are expressed in terms of processor cycles. In such an example, determining the amount of time required for the management server (302) to execute the management task may be carried out by dividing the amount of processor cycles required to execute the management task by the rate at which the management server (302) can deliver processor cycles. Similarly, determining the amount of time required for the management server (302) to repurpose one or more target endpoint (318, 320) and have the management server (302) as well as the one or more target endpoints (318, 320) participate in the execution of the management task may be carried out, for example, by dividing the amount of processor cycles required to repurpose the target endpoint (318, 320) and execute the management task by the rate at which the management server (302) and the target endpoint (318, 320) can deliver processor cycles.

The example method depicted in FIG. 3 also includes, responsive to affirmatively (314) determining to repurpose the target endpoint (318, 320), initiating (316) execution of a portion of the management task on the target endpoint (318, 320). Initiating (316) execution of a portion of the management task on the target endpoint (318, 320) may be carried out, for example, by the management server (302) sending a batch of computer program instructions that comprise some portion of the management task to the target endpoint (318, 320). Upon receipt of such computer program instructions and after the target endpoint (318, 320) has been repurposed, the target endpoint (318, 320) may execute the batch of computer program instructions that comprise some portion of the management task.

Figure 4:
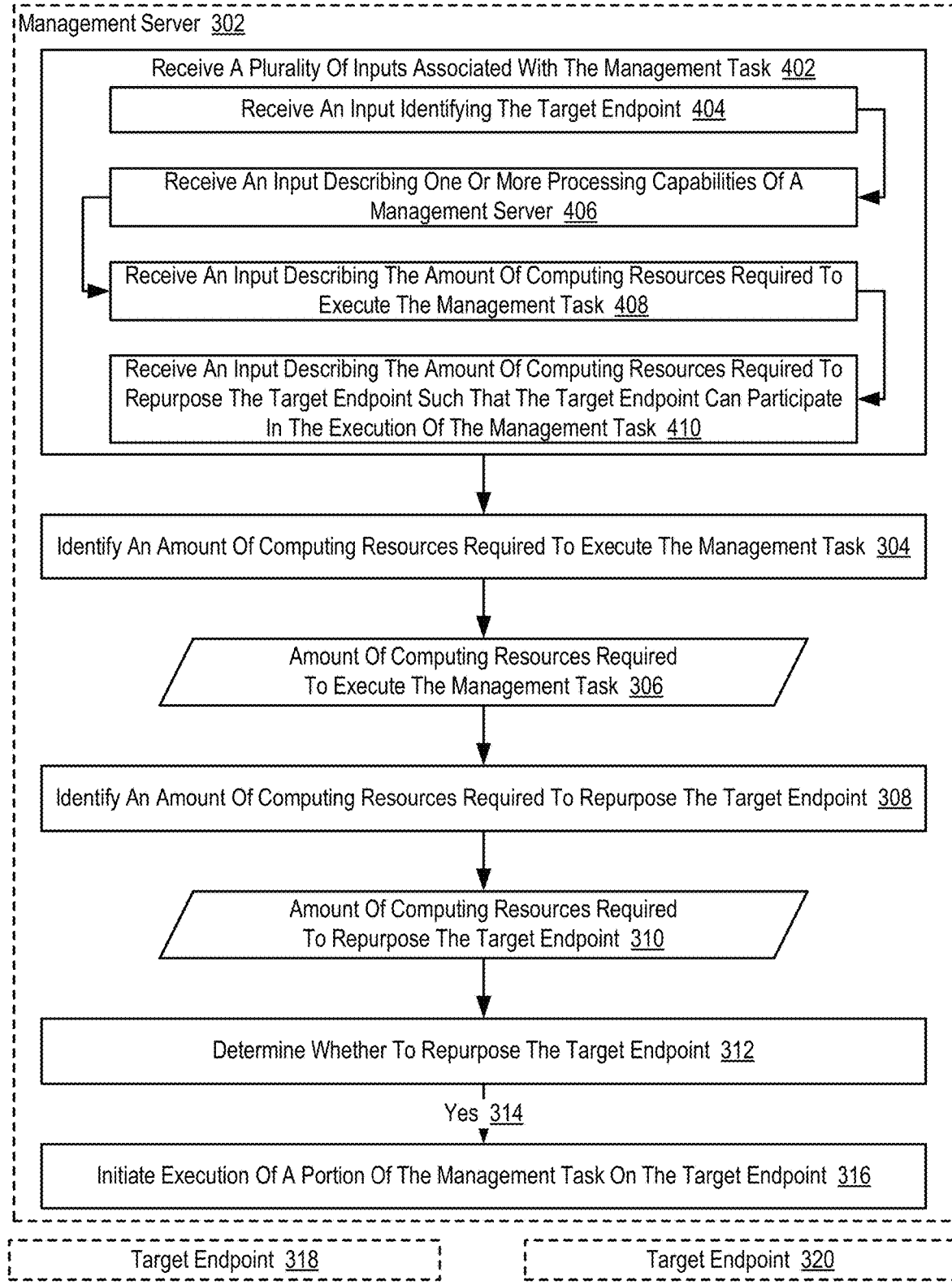
FIG. 4 sets forth a flow chart illustrating a further example method for repurposing a target endpoint to execute a management task according to certain embodiments of the present disclosure.

For further explanation, FIG. 4 sets forth a flow chart illustrating an example method for repurposing a target endpoint to execute a management task according to certain embodiments of the present disclosure. The example method depicted in FIG. 4 is similar to the example method depicted in FIG. 3, as the example method depicted in FIG. 4 also includes identifying (304) an amount (306) of computing resources required to execute a management task that controls one or more operational aspects of a target endpoint (318, 320), identifying (308) an amount (310) of computing resources required to repurpose the target endpoint (318, 320) such that the target endpoint (318, 320) can participate in the execution of the management task, determining (312) whether to repurpose the target endpoint (318, 320), and initiating (316) execution of a portion of the management task on the target endpoint (318, 320).

The example method depicted in FIG. 4 also includes receiving (402) a plurality of inputs associated with the management task. In the example method depicted in FIG. 4, receiving (402) a plurality of inputs associated with the management task can include receiving (404) an input identifying the target endpoint (318, 320). The input identifying the target endpoint (318, 320) may be embodied, for example, as unique identifier associated with the target endpoint (318, 320), as a network address associated with the target endpoint (318, 320), and so on. The input identifying the target endpoint (318, 320) may also include information describing the processing capabilities of the target endpoint (318, 320) such as, for example, the amount of memory available to the target endpoint (318, 320), the amount of processing resources available to target endpoint (318, 320), and so on. For the purposes of this disclosure, "receiving" a plurality of inputs may also include deriving, calculating, or measuring the plurality of inputs from one or more stored, measured, or received environmental data values.

In the example method depicted in FIG. 4, receiving (402) a plurality of inputs associated with the management task can also include receiving (406) an input describing one or more processing capabilities of a management server (302). The input describing one or more processing capabilities of a management server (302) may include information such as, for example, the amount of memory available to the target endpoint (318, 320), the amount of processing resources available to target endpoint (318, 320), and so on.

In the example method depicted in FIG. 4, receiving (402) a plurality of inputs associated with the management task can also include receiving (408) an input describing the amount of computing resources required to execute the management task. The input describing the amount of computing resources required to execute the management task may include information such as, for example, the amount of memory the amount of computing resources required to execute the management task, the amount of processing resources required to execute the management task, and so on.

In the example method depicted in FIG. 4, receiving (402) a plurality of inputs associated with the management task can also include receiving (410) an input describing the amount of computing resources required to repurpose the target endpoint (318, 320) such that the target endpoint (318, 320) can participate in the execution of the management task. The input describing the amount of computing resources required to repurpose the target endpoint (318, 320) may include information such as, for example, the amount of memory the amount of computing resources required to repurpose the target endpoint (318, 320), the amount of processing resources required to repurpose the target endpoint (318, 320), and so on.

Figure 5:
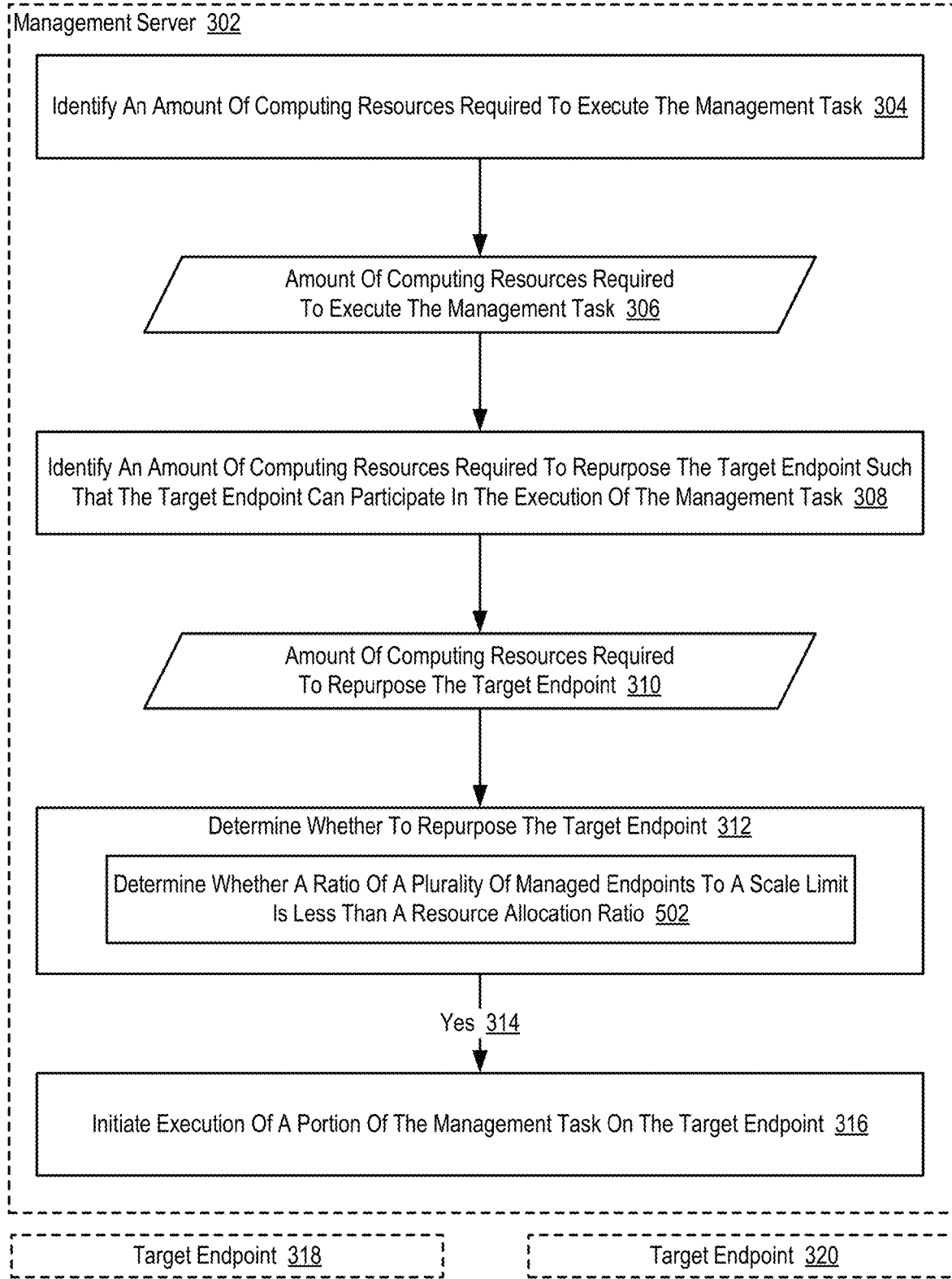
FIG. 5 sets forth a flow chart illustrating a further example method for repurposing a target endpoint to execute a management task according to certain embodiments of the present disclosure.

For further explanation, FIG. 5 sets forth a flow chart illustrating an example method for repurposing a target endpoint to execute a management task according to certain embodiments of the present disclosure. The example method depicted in FIG. 5 is similar to the example method depicted in FIG. 3, as the example method depicted in FIG. 4 also includes identifying (304) an amount (306) of computing resources required to execute a management task that controls one or more operational aspects of a target endpoint (318, 320), identifying (308) an amount (310) of computing resources required to repurpose the target endpoint (318, 320) such that the target endpoint (318, 320) can participate in the execution of the management task, determining (312) whether to repurpose the target endpoint (318, 320), and initiating (316) execution of a portion of the management task on the target endpoint (318, 320).

In the example method depicted in FIG. 5, determining (312) whether to repurpose the target endpoint (318, 320) can include determining (502) whether a ratio of a plurality of managed endpoints to a scale limit is less than a resource allocation ratio. The plurality of managed endpoints may be determined, for example, by receiving information describing the number of endpoints targeted by the management task. For example, if the management task involves deploying an image of an operating system on fifty laptop computers, the number of endpoints targeted by the management task is fifty. As used in the example calculations below, the number of managed endpoints may be referenced by the variable "x."

The scale limit may indicate a limit of the ability for a particular computing system to scale the management server (302) for the management task. For example, if the management server (302) can only deploy the operating system image for one hundred computing systems in one processing window, but the management task requires four hundred computing systems to be imaged, then the scale limit may be equal to four (e.g., four hundred divided by one hundred). As an additional example, if the management server has a dedicated 20 MB network pipe, but the management task requires 100 MB of bandwidth, the scale limit may be equal to five (e.g., one hundred divided by twenty). As used in the example calculations below, the scale limit input may be referenced by the variable "y."

The resource allocation ratio may be embodied, for example, as a ratio of the amount (310) of computing resources required to repurpose one or more target endpoints (318, 320) (denoted here as "$T_R$" and referenced as the repurposing resource allocation) to the amount (306) of computing resources required to execute a management task (denoted here as "$T_T$" and referenced as the execution resource allocation), such that the resource allocation ratio is expressed as "$T_R/T_T$". Determining (502) whether a ratio of a plurality of managed endpoints to a scale limit is less than a resource allocation ratio may be carried out, for example, by utilizing the following formula.

$$\left(\frac{x}{y}\right) < \left(2 + \frac{T_R}{T_T}\right) \quad \text{Formula 1}$$

Although Formula 1 illustrates the comparison as a particularly ordered inequality, other configurations may be possible without departing from the scope of the present disclosure. In the example formula illustrated in Formula 1, the target endpoints (318, 320) are repurposed when the inequality illustrated in Formula 1 is false. Other configurations, optimizations, factors, and/or ratios are possible without departing from the scope of the present disclosure.

Embodiments of the present disclosure may include determining an execution resource allocation associated with the management task. For the purposes of this disclosure, an "execution resource allocation" is a quantity of managed resources required for the execution of the management task. In some embodiments, this may include the processing time required to execute the task ("execution time requirement"), the processing cycles required to execute the task ("execution processor cycle requirement"), network bandwidth required to execute the task ("execution bandwidth requirement"), disk capacity required to execute the task ("execution disk capacity requirement"), etc.

In some embodiments, the execution resource allocation may be determined based at least on a received execution resource allocation input. The execution resource allocation input may identify, among other factors, the management task, the particular resource type required, the amount of that resource, and any other appropriate factors (e.g., scheduling window considerations, timing considerations, etc.). In some embodiments, the execution resource allocation may include a quantified measure of the managed resources required for execution of the management task. Continuing the examples from above, the execution resource allocation may include the total time to perform the operating system deployment (e.g., four times the processing window), the total network bandwidth required (e.g., 100 MB), etc. As used in the example calculations contained in this disclosure, the execution resource allocation may be referenced by the variable "$T_T$."

Embodiments of the present disclosure may also include determining a repurposing resource allocation for a target endpoint. A "target endpoint" may be embodied as a user endpoint under consideration for repurposing in order to aid in the execution of a management task. As described in more detail below, under certain conditions a target endpoint may be "repurposed," or enslaved to the management server. This may be accomplished, for example, by booting the management server and the target endpoint into a management-worker environment, providing them with instructions associated with the management task, and then executing the management task against both machines as a closing activity from the management server.

Even when repurposing may be beneficial in improving execution time, however, the repurposing of a target endpoint may be limited by the repurposing resource allocation for that particular endpoint. For the purposes of this disclosure, a "repurposing resource allocation" is a quantity of managed resources required for the repurposing of a target endpoint. In some embodiments, this may include the processing time required to repurpose ("repurposing time requirement"), the processing cycles required to repurpose ("repurposing processor cycle requirement"), network bandwidth required to repurpose ("repurposing bandwidth requirement"), disk capacity required to repurpose ("repurposing disk capacity requirement"), etc.

In some embodiments, a managed computing environment may encounter a management task that requires a relatively large number of repurposed endpoints. In this type of configuration, "repurposing" may include providing instructions to the target endpoint to continue repurposing identified target endpoints in a further master-slave hierarchy if the work offloaded to the first target endpoint is too large. This process may extend until all execution resource requirements for the management task have been accounted for. In some embodiments, the repurposing resource allocation may account for the amount of resources required for repurposing collectively, iteratively, or in some other manner. These values may be used differently in order to determine the repurposing threshold in different configurations. For example, a particular configuration may take into account the repurposing resource allocation for a plurality of endpoints in determining whether and how to begin repurposing. Another configuration may take into account only the repurposing resource allocation for a single endpoint prior to beginning repurposing and then determine whether to pursue successive repurposing at a later time.

In some embodiments, determining the repurposing resource allocation(s) be based at least on a received repurposing resource allocation input. The repurposing resource allocation input may identify, among other factors, the identity of the particular endpoint targeted, the capabilities of the particular endpoint targeted, the particular resource type required for repurposing, the amount of that resource, and any other appropriate factors (e.g., scheduling window considerations, timing considerations, etc.). In some embodiments, the repurposing resource allocation may include a quantified measure of the managed resources required for repurposing of one or more target endpoint(s). For example, the repurposing resource allocation may identify that it will take fifteen minutes to repurpose a target endpoint. As used in the example calculations below, the execution resource allocation may be referenced by the variable "$T_R$."

Based at least on the repurposing resource allocation and the execution resource allocation, the management server may make a determination as to whether one or more endpoints should be repurposed in order to aid in execution of a management task. This determination may involve the application of a repurposing threshold. Determining a repurposing threshold may be based at least on the execution resource allocation and the repurposing resource allocation. For the purposes of this disclosure, a "repurposing threshold" is a predetermined, calculated, and/or derived value indicating whether a particular target endpoint should be repurposed in order to execute a management task. Generally, the repurposing threshold may be met when the resources required to execute a management task on a repurposed slave endpoint are sufficiently greater than the resources required to perform the repurposing of the slave endpoint.

In some embodiments, a plurality of target endpoints may be needed to satisfy the execution resource requirements of the management task. In some configurations, the number of target endpoints selected may be associated with the scale limit associated with the management task, as illustrated below in Formula 2. Generally, a target endpoint may be selected when the repurposing required for that particular endpoint is small enough to make the repurposing worthwhile in accomplishing a management task of a particular scale. This relationship of the scale of the management task to the repurposing requirements may also inform the number of managed endpoints selected.

$$\frac{y}{2+\left(\frac{T_R}{T_T}\right)} \qquad \text{Formula 2}$$

The example ratio illustrated in Formula 2 is associated with the example ratio illustrated above in Formula 1. In this example, Formula 2 identifies a number of target endpoints to be repurposed by identifying a particular ratio. In the example, the ratio generally identifies the number of target endpoints at which the scale of the management task is compensated in such a manner as to make the repurposing threshold no longer applicable.

Once the target endpoints have been selected (whether one or a plurality), those target endpoints that satisfied the selection criteria may be identified for repurposing. The target endpoint may be identified using one or more unique identifiers, relative identifiers, etc. that may be expressed through a variety of identification values, including media access control ("MAC") address, intern& protocol ("IP") address, etc.

In some embodiments, once the target endpoint(s) are identified, the computing system may proceed with repurposing the target endpoint(s). Repurposing the target endpoint(s) may include the management server performing a portion of the management task on a subset of managed endpoints, as well as the management server performing the management task on repurposed managed endpoints (as slave or "worker" nodes). Once the management task is completed, repurposed managed endpoints may be returned to their original (that is, prior to repurposing) state.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
by first program instructions executing on a computing system, the computing system having at least one management server and a plurality of managed computing resources:
identifying, by a management server, an amount of computing resources required to execute a management task that controls one or more operational aspects of a target endpoint, wherein the management task can be executed by a management server and includes one of managing a network environment, deploying an operating system image, applying a firmware update, and applying a system update;
identifying, by the management server, an amount of computing resources required to repurpose the target endpoint such that the target endpoint can participate in the execution of the management task;
determining, by the management server in dependence upon the amount of computing resources required to execute the management task and the amount of computing resources required to repurpose the target endpoint, whether to repurpose the target endpoint; and
responsive to determining to repurpose the target endpoint, by the management server, initiating execution of a portion of the management task on the target endpoint including rebooting, by the management server, the target endpoint from a computing environment not configured to execute management tasks into a computing environment configured to be controlled by the management server and configured to execute management tasks,
wherein remaining portions of the management task not executed by the target endpoint are executed by the management server.

2. The method of claim 1 further comprising receiving a plurality of inputs associated with the management task; and
wherein identifying, by the management server, an amount of computing resources required to repurpose the target endpoint further includes determining an amount of network bandwidth required to reboot the target endpoint into a computing environment configured to be controlled by the management server and configured to execute management tasks.

3. The method of claim 2 wherein receiving the plurality of inputs associated with the management task further comprises:
receiving an input identifying the target endpoint;
receiving an input describing one or more processing capabilities of a management server;
receiving an input describing the amount of computing resources required to execute the management task; and
receiving an input describing the amount of computing resources required to repurpose the target endpoint such that the target endpoint can participate in the execution of the management task.

4. The method of claim 1 wherein determining whether to repurpose the target endpoint further comprises determining whether a ratio of a plurality of managed endpoints to a scale limit is less than a resource allocation ratio.

5. The method of claim 4, wherein the resource allocation ratio comprises a ratio of an execution resource allocation to a repurposing resource allocation.

6. The method of claim 1 wherein the amount of computing resources required to execute the management task includes an execution time requirement, an execution processor cycle requirement, an execution bandwidth requirement, or an execution disk capacity requirement.

7. The method of claim 1 wherein the amount of computing resources required to repurpose the target endpoint includes a repurposing time requirement, a repurposing processor cycle requirement, a repurposing bandwidth requirement, or a repurposing disk capacity requirement.

8. An apparatus comprising a computer processor and a computer memory operatively coupled to the computer processor, the computer memory having disposed within it computer program instructions that, when executed, cause the apparatus to carry out the steps of:
   identifying, by a management server, an amount of computing resources required to execute a management task that controls one or more operational aspects of a target endpoint, wherein the management task can be executed by a management server and includes one of managing a network environment, deploying an operating system image, applying a firmware update, and applying a system update;
   identifying, by the management server, an amount of computing resources required to repurpose the target endpoint such that the target endpoint can participate in the execution of the management task;
   determining, by the management server in dependence upon the amount of computing resources required to execute the management task and the amount of computing resources required to repurpose the target endpoint, whether to repurpose the target endpoint; and
   responsive to determining to repurpose the target endpoint, by the management server, initiating execution of a portion of the management task on the target endpoint including rebooting, by the management server, the target endpoint from a computing environment not configured to execute management tasks into a computing environment configured to be controlled by the management server and configured to execute management tasks,
   wherein remaining portions of the management task not executed by the target endpoint are executed by the management server.

9. The apparatus of claim 8 further comprising computer program instructions that, when executed, cause the apparatus to carry out the step of receiving a plurality of inputs associated with the management task; and
   wherein identifying, by the management server, an amount of computing resources required to repurpose the target endpoint further includes determining an amount of network bandwidth required to reboot the target endpoint into a computing environment configured to be controlled by the management server and configured to execute management tasks.

10. The apparatus of claim 9 wherein receiving the plurality of inputs associated with the management task further comprises:
   receiving an input identifying the target endpoint;
   receiving an input describing one or more processing capabilities of a management server;
   receiving an input describing the amount of computing resources required to execute the management task; and
   receiving an input describing the amount of computing resources required to repurpose the target endpoint such that the target endpoint can participate in the execution of the management task.

11. The apparatus of claim 8 wherein determining whether to repurpose the target endpoint further comprises determining whether a ratio of a plurality of managed endpoints to a scale limit is less than a resource allocation ratio.

12. The apparatus of claim 11 wherein the resource allocation ratio comprises a ratio of an execution resource allocation to a repurposing resource allocation.

13. The apparatus of claim 8 wherein the amount of computing resources required to execute the management task includes an execution time requirement, an execution processor cycle requirement, an execution bandwidth requirement, or an execution disk capacity requirement.

14. The apparatus of claim 8 wherein the amount of computing resources required to repurpose the target endpoint includes a repurposing time requirement, a repurposing processor cycle requirement, a repurposing bandwidth requirement, or a repurposing disk capacity requirement.

15. A computer program product comprising a computer readable medium, wherein the computer readable medium is not a signal, the computer readable medium comprising computer program instructions that, when executed, cause a computer to carry out the steps of:
   identifying, by a management server, an amount of computing resources required to execute a management task that controls one or more operational aspects of a target endpoint, wherein the management task can be executed by a management server and includes one of managing a network environment, deploying an operating system image, applying a firmware update, and applying a system update;
   identifying, by the management server, an amount of computing resources required to repurpose the target endpoint such that the target endpoint can participate in the execution of the management task;
   determining, by the management server in dependence upon the amount of computing resources required to execute the management task and the amount of computing resources required to repurpose the target endpoint, whether to repurpose the target endpoint; and
   responsive to determining to repurpose the target endpoint, by the management server, initiating execution of a portion of the management task on the target endpoint including rebooting, by the management server, the target endpoint from a computing environment not configured to execute management tasks into a computing environment configured to be controlled by the management server and configured to execute management tasks,
   wherein remaining portions of the management task not executed by the target endpoint are executed by the management server.

16. The computer program product of claim 15 further comprising computer program instructions that, when executed, cause the computer to carry out the step of receiving a plurality of inputs associated with the management task; and
   wherein identifying, by the management server, an amount of computing resources required to repurpose the target endpoint further includes determining an amount of network bandwidth required to reboot the target endpoint into a computing environment configured to be controlled by the management server and configured to execute management tasks.

17. The computer program product of claim 16 wherein receiving the plurality of inputs associated with the management task further comprises:
   receiving an input identifying the target endpoint;
   receiving an input describing one or more processing capabilities of a management server;
   receiving an input describing the amount of computing resources required to execute the management task; and
   receiving an input describing the amount of computing resources required to repurpose the target endpoint such that the target endpoint can participate in the execution of the management task.

18. The computer program product of claim 15 wherein determining whether to repurpose the target endpoint further comprises determining whether a ratio of a plurality of managed endpoints to a scale limit is less than a resource allocation ratio.

19. The computer program product of claim 18 wherein the resource allocation ratio comprises a ratio of an execution resource allocation to a repurposing resource allocation.

20. The computer program product of claim 15 wherein the amount of computing resources required to execute the management task includes an execution time requirement, an execution processor cycle requirement, an execution bandwidth requirement, or an execution disk capacity requirement.

* * * * *